Figure 1:
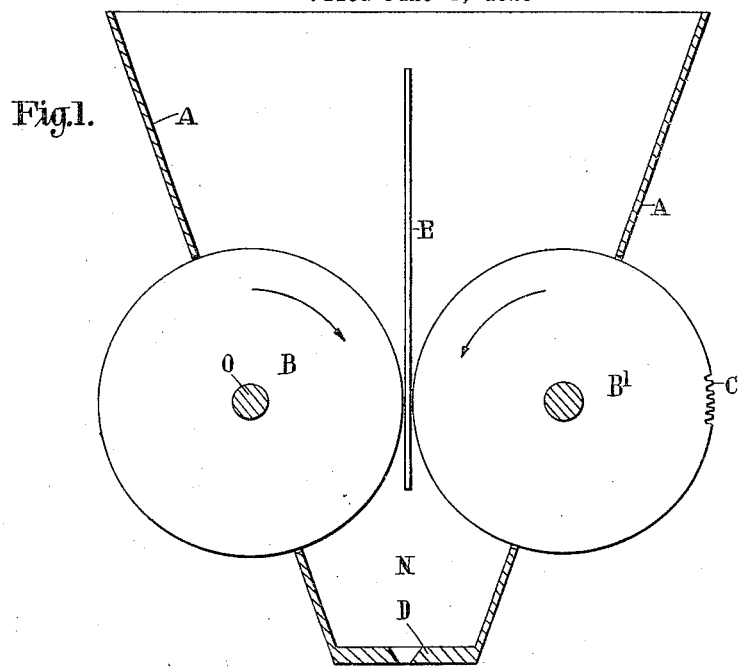

Oct. 30, 1923.

W. E. PRESCOTT

EXTRUSION PRESS

Filed June 4, 1923

1,472,249

INVENTOR
William Edward Prescott

Patented Oct. 30, 1923.

1,472,249

UNITED STATES PATENT OFFICE.

WILLIAM EDWARD PRESCOTT, OF LONDON, ENGLAND, ASSIGNOR TO MESSRS. JOHN BAKER SONS & PERKINS LIMITED, OF WILLESDEN, ENGLAND.

EXTRUSION PRESS.

Application filed June 4, 1923. Serial No. 643,252.

*To all whom it may concern:*

Be it known that I, WILLIAM EDWARD PRESCOTT, a subject of the King of England, residing at London, England, have invented certain new and useful Improvements in Extrusion Presses (for which I have filed an application in England 4th March, 1922, No. 6468 of 1922), of which the following is a specification.

My invention relates to extrusion presses or apparatus for moulding plastic substances of the kind wherein the plastic substance is forced through a die or nozzle by the action of oppositely rotating feed rolls operating within a receptacle, for instance a hopper, containing the plastic substance.

The invention is applicable to wet china clay of a pasty or dough-like consistency in which case it serves for expressing a sheet of clay to be fed to a drying apparatus such as described in the Patent No. 1,274,158, but may also be used for the extrusion of other plastic materials, such as dough or paste used in the manufacture of biscuits, chocolate, and other suitable plastic substances.

The invention consists in providing a plate (or fingers) between the feed rolls which is oscillated at a fairly rapid rate in its own plane. The width of the plate preferably corresponds to the length of the feed rolls, and the plate projects through the narrowest part of the passage between the rolls in the direction towards the die or nozzle. A fairly thin plate (or fingers) made of a sheet of metal or other suitable material may be used, and it is not essential that the lower edge of the plate should extend to the discharge opening or nozzle of the press.

The accompanying diagrammatic drawings show by way of example a press embodying the features of my invention and suitable for expressing a sheet of wet china clay.

Fig. I is a transverse vertical section of the extrusion press.

Fig. II shows diagrammatically the means for actuating the oscillating plate.

The clay or dough is contained in a vertically arranged hopper A, the base of which is provided with a nozzle or die D of a shape corresponding to the width and thickness of the sheet to be expressed. Horizontal feed rolls B, B' which are carried by shafts O, P and may be fluted or grooved as shown at C, are mounted in openings of the two sides of the hopper, preferably in such a manner that one half of the circumference of each roller projects out of the hopper. The feed rolls may be positively geared together and rotate in opposite directions, that is, the active portions of the rollers rotate towards the discharge end. Between the feed rolls is arranged a vertically oscillating plate E preferably made of metal (or a number of fingers), which is operated by an eccentric L and rod M through a double armed lever F, G pivoted at H to the frame of the hopper. The operative length of the lever arm F, upon which the rod M of the eccentric acts may be varied by any suitable means, such as by the provision of a number of holes K, in order to vary the amplitude of the stroke of the plate E. The drive of the apparatus may be provided with means for varying its speed in order to obtain the best results with different degrees of stiffness of the paste.

The means for guiding the plate E vertically, and the means for converting the angular movement of the driving lever into a rectilinear movement of the plate are not shown.

It has been found that with fairly thick china clay paste, the number of revolutions per minute of the rolls may be about 3½ and the corresponding number of oscillations per minute of the plate E may be, say 120. The plate E as it rapidly moves up and down between the two feed rolls will assist the passage of the material to and between the rolls.

Figure 2:
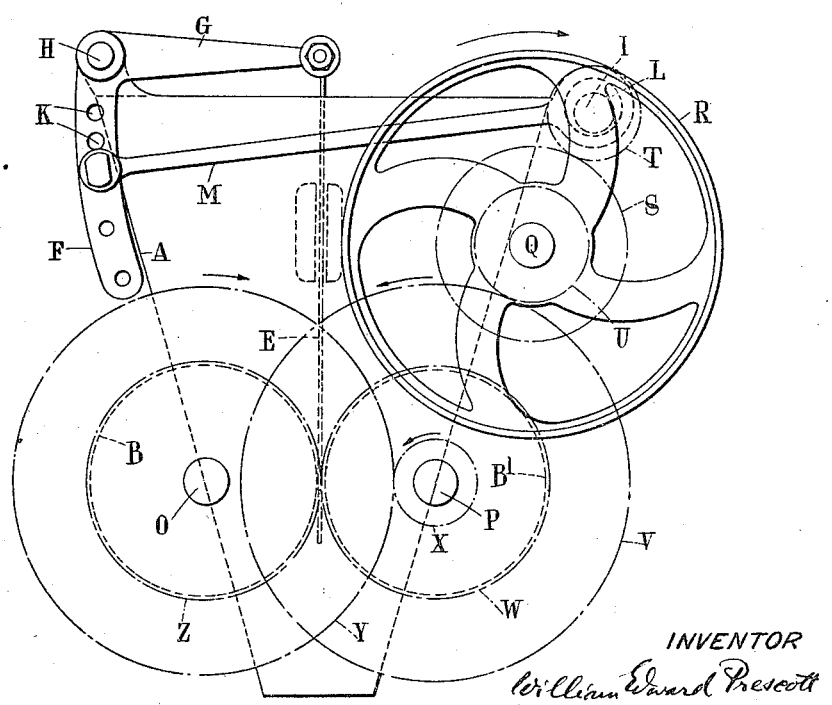

Fig. 2 shows diagrammatically the means for actuating the oscillating plate E and the feed rolls B, B¹ from one common shaft Q. The shaft Q carrying a belt pulley R or the like drives the eccentric shaft I through gears S and T. It also drives through gears U, V, X and Y the shaft O, and through the gears Z and W the shaft P. The gears V and X rotate together loosely upon the shaft P.

I claim:—

1. In an extrusion press, the combination with a receptacle provided with a discharge nozzle, of means for moving the material to be treated toward the said nozzle, and an oscillating plate extending into the said receptacle and cooperating with the said means.

2. In an extrusion press, the combination with a receptacle provided with a discharge nozzle, of oppositely rotating feed rolls, and an oscillating plate extending into the said receptacle between the said feed rolls through the narrowest part of passage therethrough, and means for oscillating the said plate.

3. In an extrusion press, the combination with a receptacle provided with a discharge nozzle, of oppositely rotating feed rolls, an oscillating plate extending into the said receptacle between the said feed rolls, a rotating shaft, and means for rotating the said feed rolls and oscillating the said plate from the said shaft.

In testimony whereof I have hereunto set my hand in the presence of two witnesses.

WILLIAM EDWARD PRESCOTT.

Witnesses:
   RUSSELL H. RHODES,
   I. MC. GIBBON.

Certificate of Correction.

It is hereby certified that the assignee in Letters Patent No. 1,472,249, granted October 30, 1923, upon the application of William Edward Prescott, of London, England, for an improvement in " Extrusion Presses," was erroneously described and specified as " Messrs. John Baker Sons & Perkins Limited," whereas said assignee should have been described and specified as *Messrs. Joseph Baker Sons & Perkins Limited*, as shown by the records of assignments in this office; and that the said Letters Patent should be read with this correction therein that the same may conform to the record of the case in the Patent Office.

Signed and sealed this 1st day of April, A. D. 1924.

[SEAL.]
                                        KARL FENNING,
*Acting Commissioner of Patents.*